March 19, 1946.  E. H. HEBERT  2,396,849
METHOD AND APPARATUS FOR UNEARTHING PIPE AND THE LIKE
Filed June 19, 1944
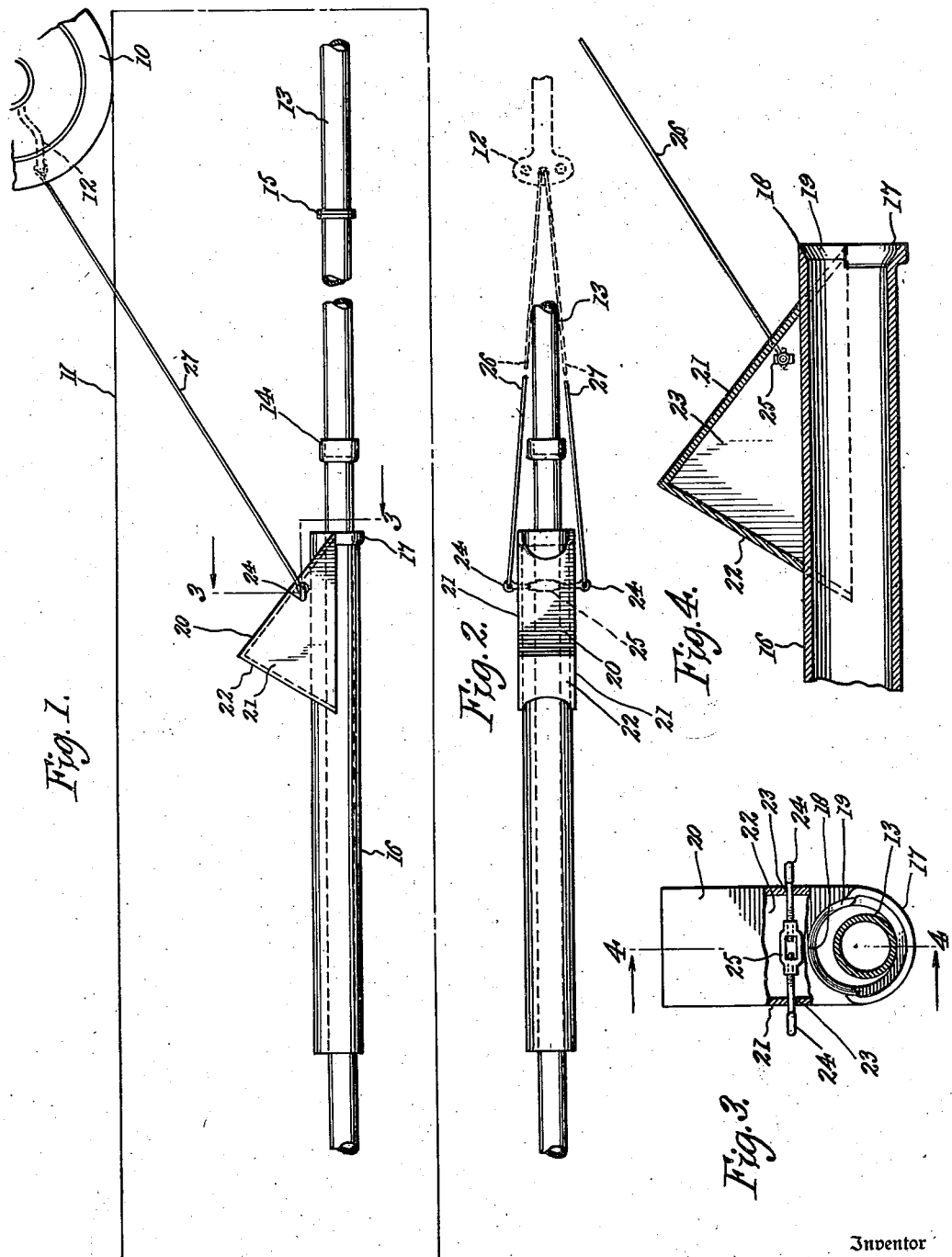
Inventor
E. H. Hebert
By Wilkinson & Mawhinney
Attorneys Patented Mar. 19, 1946

2,396,849

UNITED STATES PATENT OFFICE 2,396,849

METHOD AND APPARATUS FOR UNEARTHING PIPE AND THE LIKE

Eucharist Hiram Hebert, Plaquemine, La.

Application June 19, 1944, Serial No. 541,085

7 Claims. (Cl. 37—1)

The present invention relates to improvements in methods and apparatus for unearthing pipe and the like, and consists more particularly in the method and means whereby pipe may be stripped from the ground efficiently, economically and in a minimum space of time.

Another object of the invention is to provide an improved method and apparatus for unearthing pipe and the like in which advantage is taken of the tractor to secure the necessary highly developed power for severing the slice of earth which overlies the pipe and initially dislodging and raising such earth, thereby freeing the pipe completely from the earth and permitting its removal by being pulled longitudinally through openings cut at intervals.

A further object of the invention is to provide an improved pipe stripper so constructed and arranged as to completely free the pipe of any earth, and in which any limitation on the speed of travel and performance of the stripper is only that of the tractor.

With the foregoing and other objects in view, the invention will be more fully described hereinafter, and will be more particularly pointed out in the claims appended hereto.

In the drawing, wherein like symbols refer to like or corresponding parts throughout the several views:

Figure 1 is a side elevation, with parts broken away and parts shown in section of an improved pipe stripper constructed in accordance with the present invention and shown in place upon a pipe lying in situ and coupled to a tractor indicated fragmentarily.

Figure 2 is a top plan view of the same with the tractor draw bar illustrated in broken lines.

Figure 3 is a vertical section taken on the line 3—3 in Figure 1.

Figure 4 is a fragmentary longitudinal section taken on an enlarged scale.

Referring more particularly to the drawing 10 designates the wheels of a tractor traveling on the surface of the ground which is indicated at 11 and 12 represents the draw bar of such tractor.

The string or line of pipe is indicated at 13, the same being laid in the ground to the varying depths desired. In such pipe lines there are encountered coupling collars 14, welds 15 and other external obstructions.

The improved device embodies an open ended substantially cylindrical sleeve 16 having an internal diameter in excess of that of the external diameter of the pipe 13 and loosely and slidably fitted thereover. Such sleeve 16 is belled at its leading edge, as shown at 17 for the lower semi-circular portion thereof. The remaining upper semi-circular portion of the leading edge is sharpened to a knife edge 18 by means of a bevel 19 which extends from the outer wall of the sleeve at the edge 18 inwardly to the inner pipe wall at a point spaced from the edge 18. Affixed, as by welding or otherwise, to the forward portion of the sleeve 16 is a wedge or inclined plane 20 having its lower edge toward the leading edge 17, 18 of the sleeve 16 and with its high point spaced rearwardly from such edge. For purposes of strength, the wedge wall 20 may be part of a box-like structure having the side walls 21 and the rear wall 22. Such walls may embrace the sleeve 16 and be welded or otherwise secured thereto.

Passing through openings 23 in the side walls 21 are screw eyes 24 connected by a turnbuckle 25. To the screw eyes 24 are connected two cables 26 and 27 which converge forwardly and are secured to the draw bar 12 of the tractor.

Obviously the tractor might be any other power unit.

In the use of the device, and in practicing the method, a hole is dug from ground level 11 to pipe line 13. The pipe line 13 is then cut and the pipe stripper slipped over one end of the severed pipe. The two cables 26 and 27 are attached to the tractor and to the pipe stripper in the manner illustrated and previously described. The tractor or other power unit 10 is thereupon put in motion and steered directly over the pipe line to be taken up. The pipe stripper is pulled after the tractor by the two cables. As the tractor travels, the two cables cut a slice of earth in the ground from the ground level to the pipe to be removed. The diagonal position assumed by the cables 26 and 27 favorably permits the same to make a shearing cut through the ground, thus facilitating the severance, reducing the power necessary to effect the cut and taking strain off the sleeve and the wedge box. It will be noted that this slice of dirt, initiated in its cutting at the surface of the ground by the forward portions of the cables 26 and 27, is not completely carved out until the knife edge 18 incises the base of the same. This base thereupon promptly encounters the inclined plane 20 which slides beneath the same thus raising the severed slice as a whole and causing the same to be displaced upwardly thus removing the weight of the severed slice from the pipe in a manner to permit of its ready removal longitudinally through its original bed which has been enlarged by the device.

As clearly seen in Figure 2, the cables 26 and 27 preferably converge forwardly to produce a triangular form of slice which eases the cutting and also the action of the inclined plane 20 and the subsequent lifting of the severed earth.

It will be noted further that the slice of earth, being raised by the angle wall 20 attached on the pipe stripper, leaves the pipe 13 completely free of any earth.

The bell 17 will encounter the external obstructions 13, 15, etc. and cause the sleeve 16 to ride over these obstructions. In a similar manner the bevel 19 will encounter the obstructions and tend to ride over the same.

Owing to the fact that sleeve 16 is of greater diameter than pipe 13, it is important that the knife edge 18 and the bell 19 be in the sense shown in Figure 4 rather than that the knife edge be upon the inner wall with the taper extending upwardly and rearwardly of the sleeve 16. In the latter instance such knife edge would tend to catch any angular shoulders of the collars 14, welds 15 and other obstructions.

To remove the pipe from the ground after the stripper has been run over the pipe, holes may be dug at intervals, the pipe cut and the sections between cuts pulled out as by connecting the lengths of the pipe with the tractor or other pulling equipment. This method of operation is most highly desirable because there is little or no back filling to be done.

The pipe stripper itself may be made of heavy pipe 16 of metal or other suitable material. The angular wall or wedge 20 as well as its box may be also made of metal. The eye 24 and turn buckle 25 construction forms a very rugged attachment for the cables to each side of the stripper.

The improved pipe stripper can be made for and used on any size pipe and will work satisfactory at almost any depth within reason.

It will be understood that in accordance with the present method no pre-excavation over the pipe line is necessary except for that portion of the line on which the pipe stripper is initially inserted and except for excavation at intervals for the purpose of attaching a line to and pulling the pipe from the ground by a tractor or other power unit.

In accordance with the present method the earth is loosened above the pipe and the pipe itself is loosened while the pipe is still under ground. The loosening is, however, sufficient to enable the pipe to be pulled out by a tractor or power unit.

An important feature of the invention is that the present device operates without a trench or ditch having to be dug, which eliminates backfilling.

The improved device also serves, in effect, as a dirt remover or cleaner of the outside of the pipe. The pulling of the stripper along and around the pipe leaves the pipe substantially free of dirt. The slice of dirt remains intact, slightly raised above ground level, its weight or pressure being taken off the pipe by the operation of the device. The pipe then lying in the ground in a hole or circle larger than its diameter, and free from dirt and pressure from the surrounding earth is pulled or slid through the earth longitudinally or horizontally upwardly through the hole cut at intervals in the slice of dirt. This pulling has little or no effect on the intactness of the slice except at the very mouth of the opening. In other words when the cable is fastened on to a segment of pipe through the opening, the forward and upward motion of the power unit in pulling the pipe out would disturb the slice of dirt near the opening; otherwise the slice remains intact. Even this slight disturbance of the slice could be entirely eliminated by increasing the length of the opening through which the pipe is removed thereby reducing the vertical pull and tending to make the pull more horizontal.

It is obvious that various changes and modifications may be made in the details of construction and design of the above specifically described embodiment of this invention without departing from the spirit thereof, such changes and modifications being restricted only by the scope of the following claims.

What is claimed is:

1. The herein described method for removing sub-surface pipe which consists in initially cutting the earth in a slice immediately above the line of pipe and to the surface, cutting the pipe in sections, and hauling or pulling the sections of pipe longitudinally out of the earth at apertures or openings cut through the slice at intervals.

2. The herein described method for the removal of sub-surface pipe which consists in severing a slice of earth from the pipe to the surface of the ground, displacing said slice of earth sufficiently to break its cohesion and adherence to surrounding portions of the undisturbed earth, cutting the pipe in sections and hauling the sections longitudinally up through holes cut in the slice at intervals.

3. The herein described method of unearthing sub-surface pipe which consists in initially cutting a slice of earth continuously above the line of pipe and to the surface having a substantially triangular cross section, simultaneously cutting the base of the slice from the surrounding earth, camming upwardly upon the broad base of the triangular slice of severed earth to dislodge the slice from adjacent portions of the undisturbed earth and to tend to raise the earth lying above the pipe, digging holes at intervals, cutting the pipe through the access afforded by such holes, attaching cables to the pipe and pulling the pipe sections through the earth longitudinally upwardly without requiring any substantial back filling except at the interval holes through which the pipe is pulled out of the ground.

4. A device of the character described comprising an open ended sleeve having its leading edge formed with a knife edge, an inclined plane on said sleeve, and cables for pulling said sleeve and inclined plane.

5. A device for unearthing sub-surface pipe comprising an open ended sleeve of greater diameter than said pipe slidably fitted over the line of pipe and having its leading edge belled at the lower semi-circular portion thereof and sharpened at the upper semi-circular portion thereof, an inclined plane on the upper portion of said sleeve, and cables coupled to pull said sleeve and inclined plane forwardly along the pipe.

6. A device for unearthing sub-surface pipe comprising an open ended sleeve having a greater diameter than the pipe and loosely fitted over the line of pipe, a knife edge upon the upper semi-circular leading edge of said sleeve with a bevel portion extending inwardly and axially, a bell on the lower semi-circular portion of said leading edge, a box composed of side, rear and a front inclined wall secured to the upper portion of said sleeve at its forward part, screw eyes inserted throuhg said side walls, a turnbuckle connecting said screw eyes, a pair of cables, one attached to each of said eyes and converging forwardly and upwardly, and a power unit for moving along the surface connected to the forward convergent ends of said cables.

7. A device of the character described comprising a movable tubular guide of a diameter sufficiently large to slip freely over a line of pipe to be unearthed and to move freely along the line of pipe, earth cutting means carried at the forward upper portion of said guide positioned relatively to the pipe to sever the earth immediately above the same, an inclined plane beginning at said cutting means and rising progressively back of said cutting means to a height substantially less than the depth to which the pipe is buried whereby to dislodge from the surrounding earth the severed section of earth without removing same from the trench in which the pipe is buried, and side severing means connected to opposite side portions of the inclined plane and guide and extending up to and beyond the surface affording means also for drawing the device along in the trench.

EUCHARIST HIRAM HEBERT.